US012501120B1

(12) United States Patent
Bagyura et al.

(10) Patent No.: US 12,501,120 B1
(45) Date of Patent: Dec. 16, 2025

(54) METHOD AND SYSTEM FOR AUTOMATED GENERATION OF JOB VIDEOS

(71) Applicant: Lensa Inc., West Chester, PA (US)

(72) Inventors: Istvan Bagyura, Budapest (HU); Pal Megyeri, Biatorbagy (HU); Andras Toth, Budapest (HU); Gergely Romhanyi, Budapest (HU); Gergely Vari, Budakeszi (HU)

(73) Assignee: Lensa Inc., West Chester, PA (US)

( * ) Notice: Subject to any disclaimer, the term of this patent is extended or adjusted under 35 U.S.C. 154(b) by 0 days.

(21) Appl. No.: 19/290,977

(22) Filed: Aug. 5, 2025

(51) Int. Cl.
| | |
|---|---|
| *H04N 21/8405* | (2011.01) |
| *G06F 16/78* | (2019.01) |
| *H04N 21/81* | (2011.01) |
| *H04N 21/845* | (2011.01) |
| *G06Q 10/1053* | (2023.01) |

(52) U.S. Cl.
CPC ......... *H04N 21/8405* (2013.01); *G06F 16/78* (2019.01); *H04N 21/8106* (2013.01); *H04N 21/845* (2013.01); *G06Q 10/1053* (2013.01)

(58) Field of Classification Search
CPC ........... H04N 21/8405; H04N 21/8106; H04N 21/845; G06F 16/78; G06Q 10/1053
USPC ....................................................... 386/290
See application file for complete search history.

(56) References Cited

U.S. PATENT DOCUMENTS

| | | |
|---|---|---|
| 10,755,040 B2 | 8/2020 | Heie |
| 11,769,327 B2 | 9/2023 | Cheng et al. |
| 2008/0215984 A1* | 9/2008 | Manico ................ G06F 16/437 |
| 2015/0199647 A1* | 7/2015 | Shin .............. G06Q 10/063118 |
| | | 705/321 |
| 2023/0253015 A1 | 8/2023 | Stewart et al. |
| 2023/0282243 A1 | 9/2023 | Moore et al. |
| 2025/0210064 A1* | 6/2025 | McGuire .............. G11B 27/034 |

FOREIGN PATENT DOCUMENTS

WO    WO-2025122922 A1 *  6/2025  ............. G06N 3/092

OTHER PUBLICATIONS

Invideo AI, Free AI Video Generator, 2024, 14 pages.

* cited by examiner

*Primary Examiner* — Loi H Tran
(74) *Attorney, Agent, or Firm* — Fox Rothschild LLP (57) ABSTRACT

Methods and systems for automatically generating a job listing video, and presenting the video to a user of an electronic device, are disclosed. When the system receives a selection for a job listing, the system processes text of the listing to extract keywords. For each of the keywords, the processor will search a video clip library to retrieve corresponding video clips. If a video clip is not found in the video clip library, the processor will generate a new video clip with information generated by an AI model combined with visual information from a content library. The system will merge the information to create video clips, and the system will serve the video clips to a user in a defined sequence.

17 Claims, 6 Drawing Sheets

METHOD AND SYSTEM FOR AUTOMATED GENERATION OF JOB VIDEOS

BACKGROUND

Many job search websites are available to connect job applicants with potential employers. However, these sites do not always include features that can help job applicants be well-informed about the jobs for which they are applying. Some job listings contain only general descriptions of a position, such as title and qualifications. This can cause qualified applicants to overlook jobs that may interest them, which leads to an insufficient job candidate pool for the potential employer. Conversely, it can cause some applicants to apply for jobs for which they are not qualified or that would not interest them, which leads to inefficiency in applicant data processing and storage.

Although some job listing sites have attempted to solve these issues with technical solutions, these solutions have not been adequate. For example, some sites provide users with weblinks to the potential employer's website, but after clicking the link the applicant must then search through multiple pages to find relevant information about the company's work environment, if such information is available on the website at all. If the weblinks leads to a specific page with employment information, the weblink must be maintained to ensure that it is not broken, and to ensure that it continues to link to a relevant page.

This document describes a system that can help address the issues above by automatically generating and delivering information that enables qualified job applicants to receive information and connect with potential employers in online job application systems, while helping to reduce the system inefficiency caused by applications from applicants who are unqualified for or disinterested in the position.

SUMMARY

In various aspects, this document describes a method for generating a job listing video, as well as systems and computer program products to implement the method. The method includes, by a processor, identifying a storyboard comprising a sequence of scenes. Each scene is associated with a unique job information category. In response to receiving a selection of a job listing from a user electronic device, the processor will process text of the job listing to extract a plurality of keywords, each of which is associated with one of the job information categories. For each of the keywords, the processor will use the keyword to search a video clip library to retrieve any video clips having metadata that corresponds to the keyword. For any keyword for which a video clip is not found in the video clip library, the processor will generate a new video clip by (a) using the keyword to generate a prompt, (b) inputting the prompt to a machine learning model, (c) receiving narrative output by the machine learning model, (d) using a text-to-speech processing module to process the narrative and convert the text to audio, and (e) generating the new video clip to include the audio. The processor will then stream each new video clip and each retrieved video clip to the user electronic device in an order that corresponds to the sequence of scenes in the storyboard.

In some embodiments, the job information categories may include employer name, job description, and compensation information.

In some embodiments, generating the new video clip further includes: (a) accessing a visual content library and retrieving visual content that corresponds to one or more content elements of the narrative, to the keyword, or the job information category that corresponds to the keyword; and (b) merging the visual content with the audio so that the audio will be presented with the retrieved visual content when the new video clip is displayed on the user electronic device.

In some embodiments, the method further includes saving the new video clip to the video clip library for use in response to future job listing selections.

In some embodiments, the method further includes, in response to identifying that at least one of the scenes is a missing scene, where the missing scene is a scene from the storyboard that did not have a corresponding keyword in the text of the job listing: (a) generating a second prompt that is based on the category of the missing scene to generate a second prompt; (b) inputting the second prompt to the machine learning model; (c) receiving second narrative generated by the machine learning model; (d) using the text-to-speech processing module to process the second narrative and convert the text to second audio; and (e) generating a second new video clip that includes the second audio. Optionally, generating the second new video clip may be done before streaming each new video clip and each retrieved video clip to the user electronic device begins. Alternatively, generating the second new video clip may be done after streaming at least one of the new video clips or retrieved video clips to the user electronic device begins.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art.

As used in this document, the term "comprising" (or "comprises") means "including (or includes), but not limited to."

When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another and is not intended to require a sequential order unless specifically stated.

The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

Figure 1:
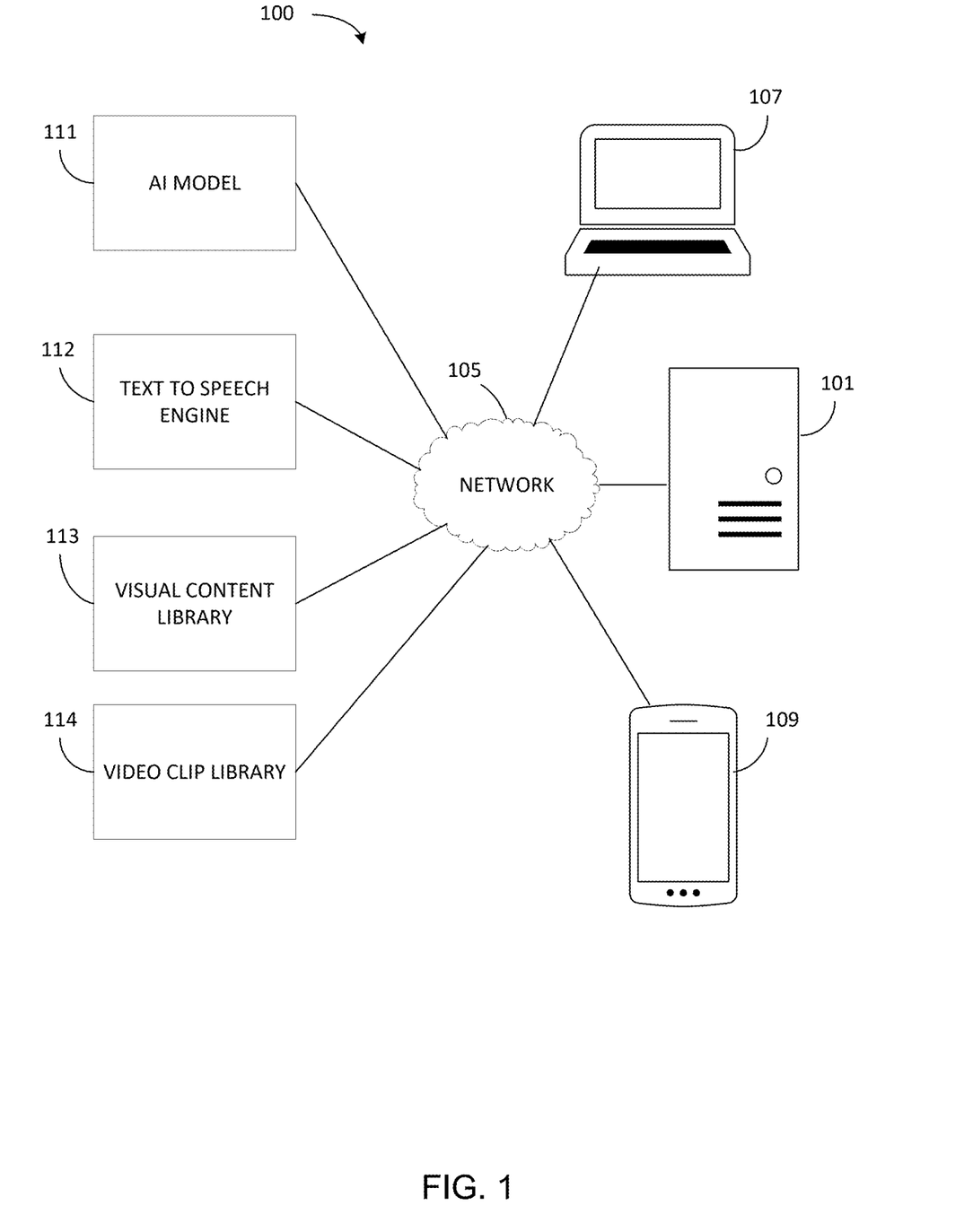
FIG. 1 illustrates elements of an example system and related components for generating and presenting job videos.

FIG. 1 is a block diagram illustrating various features that an automated job video generation system 100 may include and/or use. The system 100 includes one or more computing devices that serve as the processor 101 of the video generation methods described below.

The processor 101 is communicatively connected to one or more content libraries, including a visual content library 113 containing digital image files, each of which is associated with metadata that describes and/or categorizes content of the digital images. The content libraries also include a video clip library 114 containing video files, each of which is also associated with metadata that describes and/or categorizes content of the digital images. All or parts of the content libraries may be stored on a memory of the computing device that contains processor 101, or all parts of the content libraries may be stored on systems that are external to the processor 101 computing device and accessible via one or more networks 105 such as a local area network or the internet.

The system also includes or is in communication with one or more artificial intelligence (AI) models 111 that are trained to generate text in response to prompts. Such models are also known as large language models (LLMs). The models 111 may include a publicly available LLM such as the GPT and ChatGPT models from OpenAI, Microsoft's Copilot chatbot, or Google's Gemini chatbot, as well as private generative AI models. The models 111 also may include one or more AI image generators such as those known as Midjourney, Stable Diffusion, and DALL-E.

The system also includes or is in communication with one or more text-to-speech (TTS) conversion engines 112 that are programmed to generate audio files from text, thus converting the text to audible sound. In practice, a TTS engine may normalize the raw text to convert any numbers, symbols, or other non-text characters into text. The TTS engine may then assign phonetic transcriptions to each word in the text, which is sometimes referred to as text-to-phoneme conversion. An audio synthesizer will then convert the phonetic transcriptions into sound. Example TTS engines include those known as Natural Reader, Microsoft Narrator, and Narakeet.

The processor 101 can also communicate with one or more user electronic devices 107, 109 via the one or more networks 105. The user electronic devices 107, 109 will include a display that can display the generated videos, as well as a user interface such as a touch screen, keyboard or keypad, or microphone via which a user may enter commands and prompts.

Figure 2:
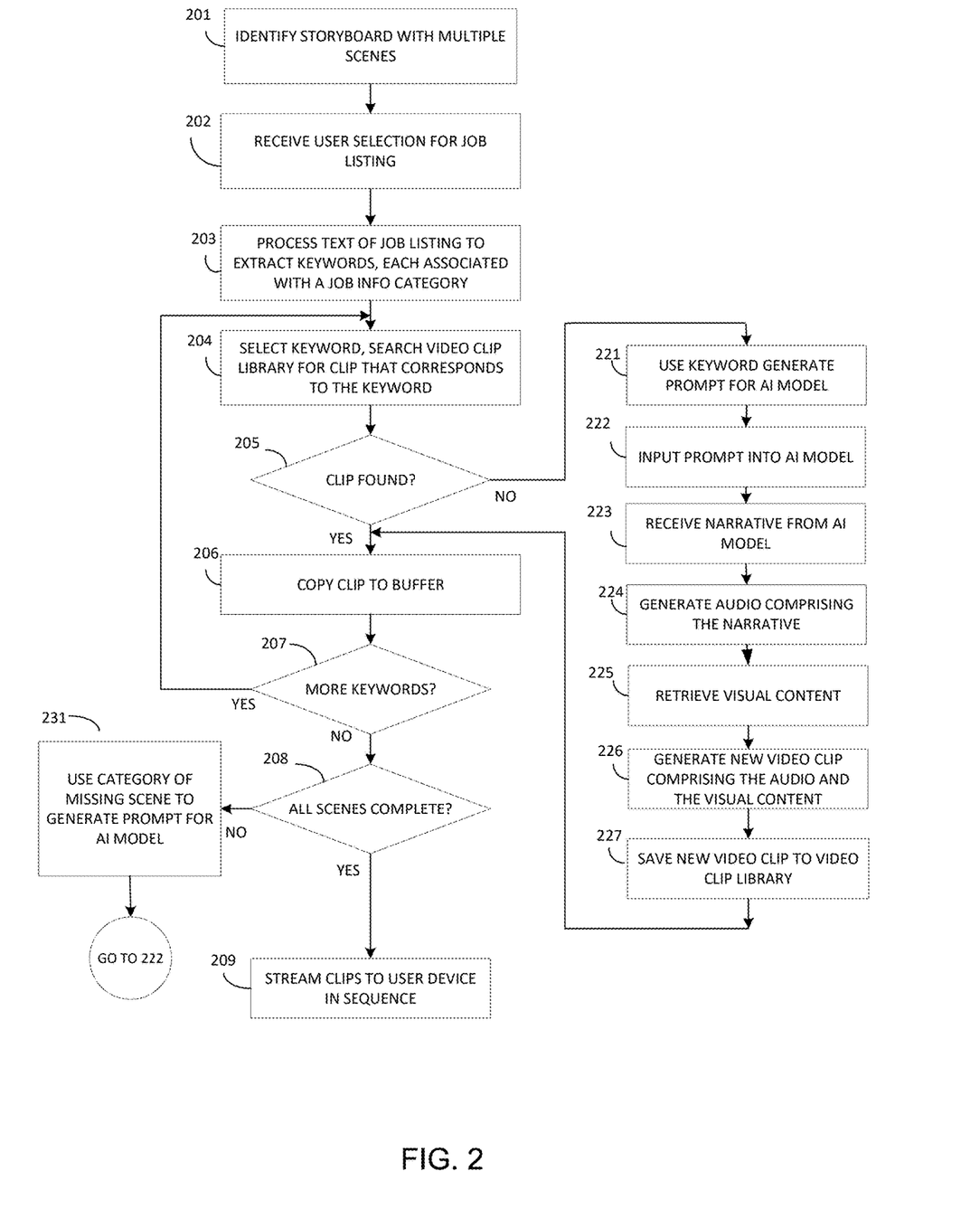
FIG. 2 illustrates elements of a method for generating and delivering job videos.
Figure 3:
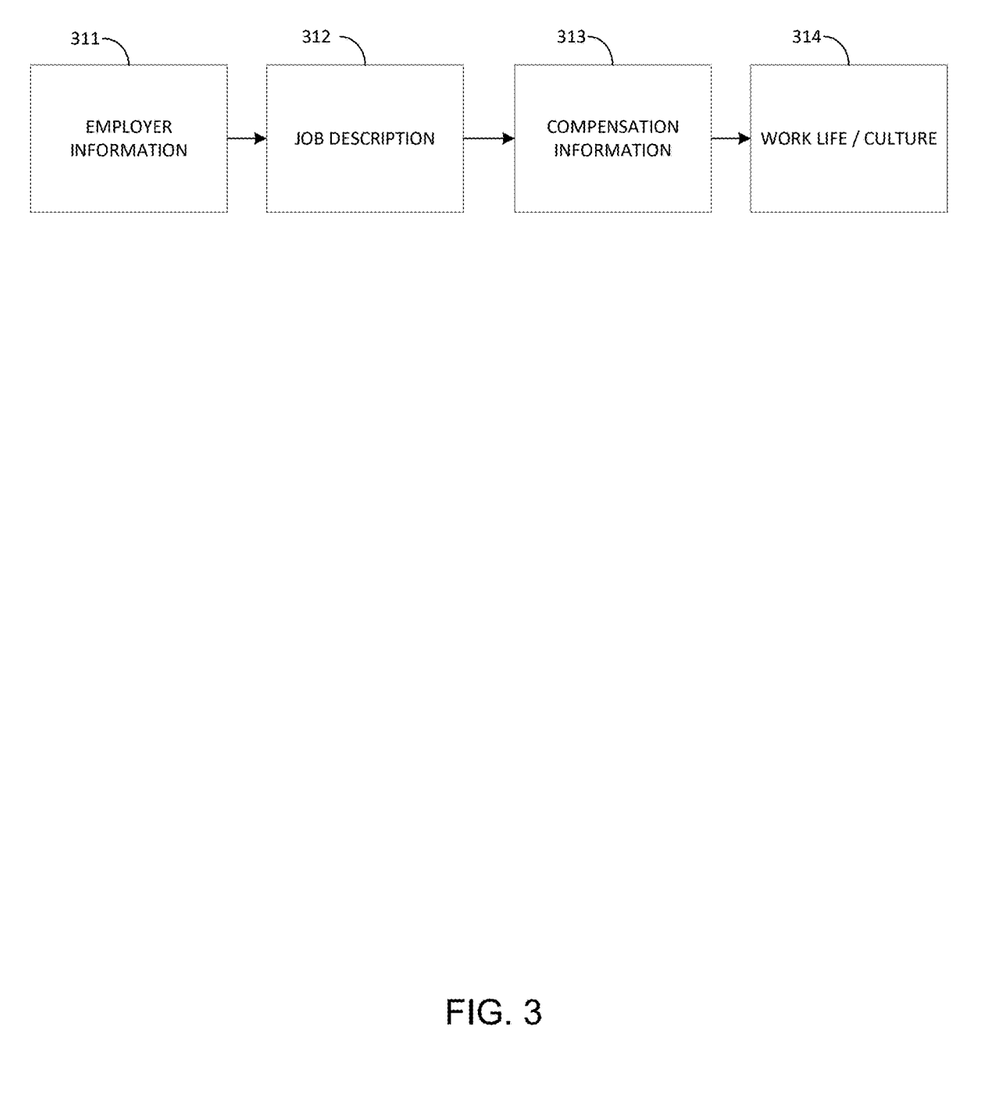
FIG. 3 illustrates an example storyboard that includes a set of scenes for a job video.

FIG. 2 illustrates a method of generating a job listing video. At 201 a processor of the system will identify a storyboard comprising a sequence of scenes. The storyboard is a template or outline for a job video, with general definitions of the scenes that will make up the job video. Each of one or more of the scenes is associated with a unique job information category. For example, FIG. 3 illustrates example scenes of a storyboard that provide information about the following categories of job information: (a) employer information 311 with information about the employer such as location(s), number of employees, industry, and history; (b) job position information 312 such as job title, degree required and/or other qualifications, and job responsibilities; (c) compensation information 313, such as a salary number or a range, commissions or other incentives, and benefits information; and (d) culture and work life information 314, which may relate to the job category, the employer, or both.

Figure 4:
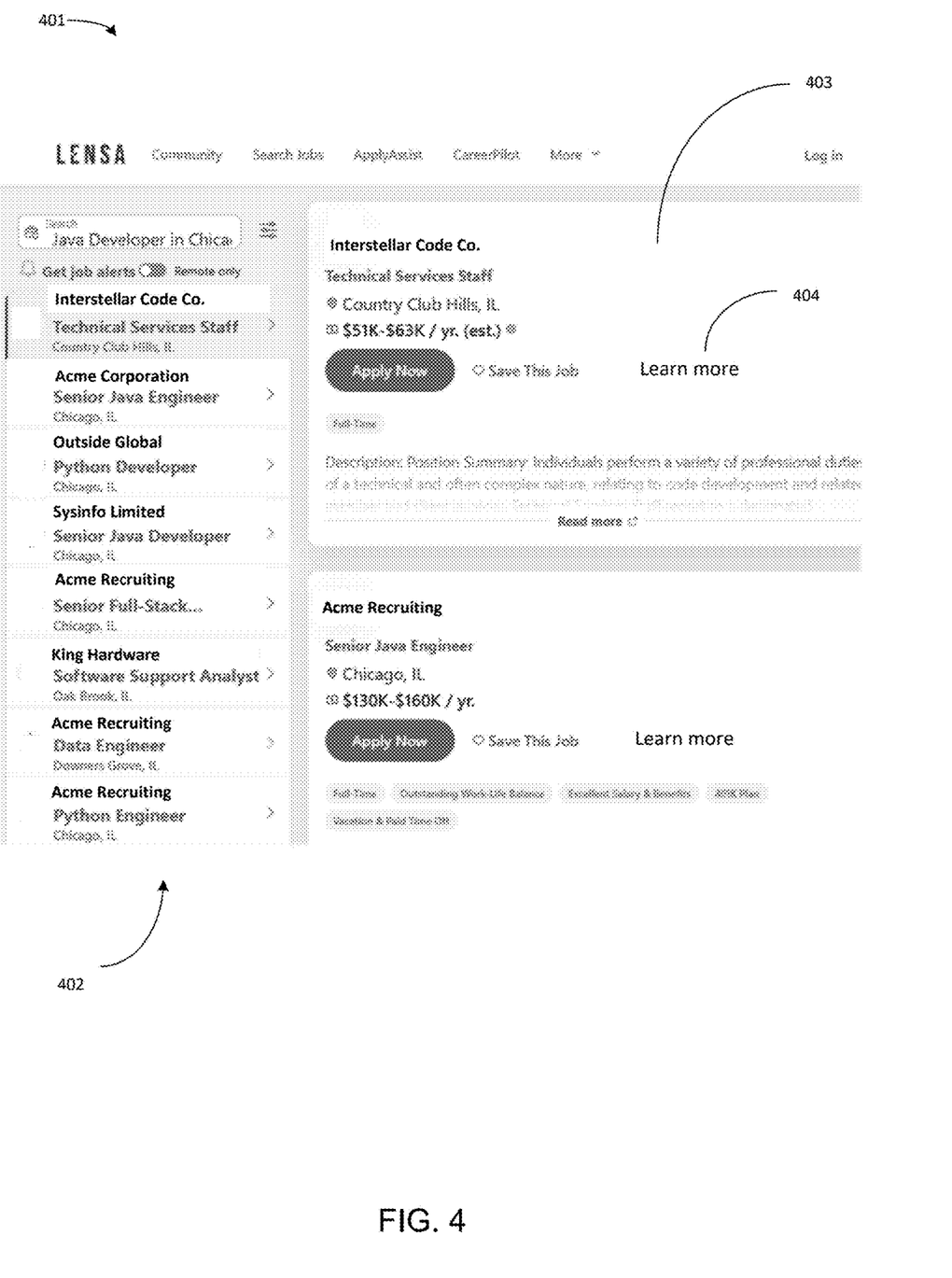
FIG. 4 illustrates an example job listing user interface, via which users can receive information about jobs that employers have posted.

The system will post, on a platform such as a website and/or mobile application, various job listings that potential applicants may view. FIG. 4 illustrates an example user interface 401 of such a platform. The system may receive the job applications itself via the platform, or the platform may link to third party job application platforms (such as those available on the website of the employer who is hiring for the job). In the example shown in FIG. 4, the user interface 401 displays a list 402 of various jobs, and the system displays one or more job listings 403 as a user scrolls through or selects jobs in the list. Some or all of the job listings may include a prompt 404 via which the user can obtain additional information about the job. The prompt 404 may be a link to a video player interface that will present a job video to the user as shown in FIG. 4. Alternatively, the video player may be accessible in the job listing itself, and the prompt may be a "play" button or other actuator by which the user can prompt the system to play the video.

Returning to FIG. 2, after the user selects a prompt to receive more information for a particular job that is listed in the platform (step 202), the system will process text of the job listing to extract one or more keywords from the job listing (step 203). When doing this, the system will look for keywords that relate to one or more of the job information categories that relate to scenes from the storyboard, with the goal of finding at least one keyword for each information category (and thus each scene) of the storyboard. The association of keywords with job information categories may be done by extracting the keywords from particular fields of the job listing, such as an employer field that includes keywords that are the employer name, a location field that provides keywords for one or more job locations, a job description field, and a salary field that provides keywords for compensation. In addition or alternatively, the association of keywords with job information categories may be done with natural language processing (NLP) system such as an AI classifier, a hidden Markov model, a named entity recognition (NER) system, and/or other systems that are able to recognize semantic similarity between extracted words and a known set of reference terms (such as those for job category information).

At 204, for each of the keywords, the system will use the keyword to search the video clip library to retrieve any video clips that are associated with metadata that corresponds to the keyword. If a video clip is found (205: YES), then at 206 the system will retrieve the video clip and copy the video clip to a buffer for use in the job video. If multiple candidate clips are returned, the system may apply one or more rules to select the clip that will be saved in the buffer. Any suitable rules may be used, such as a scoring algorithm that assigns a higher score to clips that are associated with multiple extracted keywords, and/or a randomization algorithm.

If a video clip is not found in the video clip library for a given keyword (205: NO), the system will generate a new video clip for use in the scene for the job information category that is associated with the keyword. To do this, at 221 the system may use the keyword to generate a prompt, and at 222 the system will input the prompt to a machine learning model. To generate the prompt at 221, the system may include the keyword, along with other information from the job listing and/or relating to the scene such as the job information category, in a text string. The system may simply include these words in the text string in sequence, or it may place the keywords into a formatted template such as a prompt template. For example, if a keyword for the work life/culture category is "Chicago", which identifies the job's location, bit a video clip is not available in the library for Chicago, the prompt template may be "describe five positive features of living and working in ______, and the system may place "Chicago" in the blank. The AI model may be one such as AI model 111 of FIG. 1, which has been trained to generate and return narrative in response to the prompt.

At 223 the system will receive text (i.e., narrative for the video clip) that the machine learning model generated. At 224 the system will provide the text to a text-to-speech processing module (such as TTS engine 112 of FIG. 1) to process the narrative and convert the text to audio.

At 225 the system will access a visual content library and retrieve visual content that corresponds to one or more content elements of the narrative, to the keyword, and/or to the job information category that corresponds to the keyword. The visual content library may be library 113 of FIG. 1, and it may include digital image files that are associated with metadata. The image files may include still image files, video files, or both. When the system finds a file with metadata that is semantically similar to one or more elements of the narrative, keyword, or job information category, it will select that video content to make up part of the video clip. If multiple candidate image files are available, the system may score them as described above in step 206. Optionally, the system may select multiple image files that it will string together in the video clip.

At 226 the system will generate the new video clip by merging the visual content with the audio in a digital file, files or data stream so that the audio will be presented with the retrieved visual content when the new video clip is output on a display of an electronic device. At 227 the system will save the new video clip to the video clip library for use in future job listing selections. When saving the video clip to the library, the system may associate and store metadata with the video clip, such as metadata that includes or relates to the narrative, keyword, or job information category that the system used to generate the clip. The process then moves to step 206, in which the system will save the video clip to the buffer for use in the job video.

After each clip is retrieved or generated and saved to the buffer at 206, if additional keywords for which video clips have not yet been buffered (207: YES), the system will return to step 204 and either generate or retrieve a video clip for the next keywords. However, if no keywords remain (207: NO) and optionally if all scenes of the storyboard are complete (208: YES), at 209 the system will stream the clips to the user device in a sequence corresponding to the sequence of the scenes in the storyboard.

Figure 5:
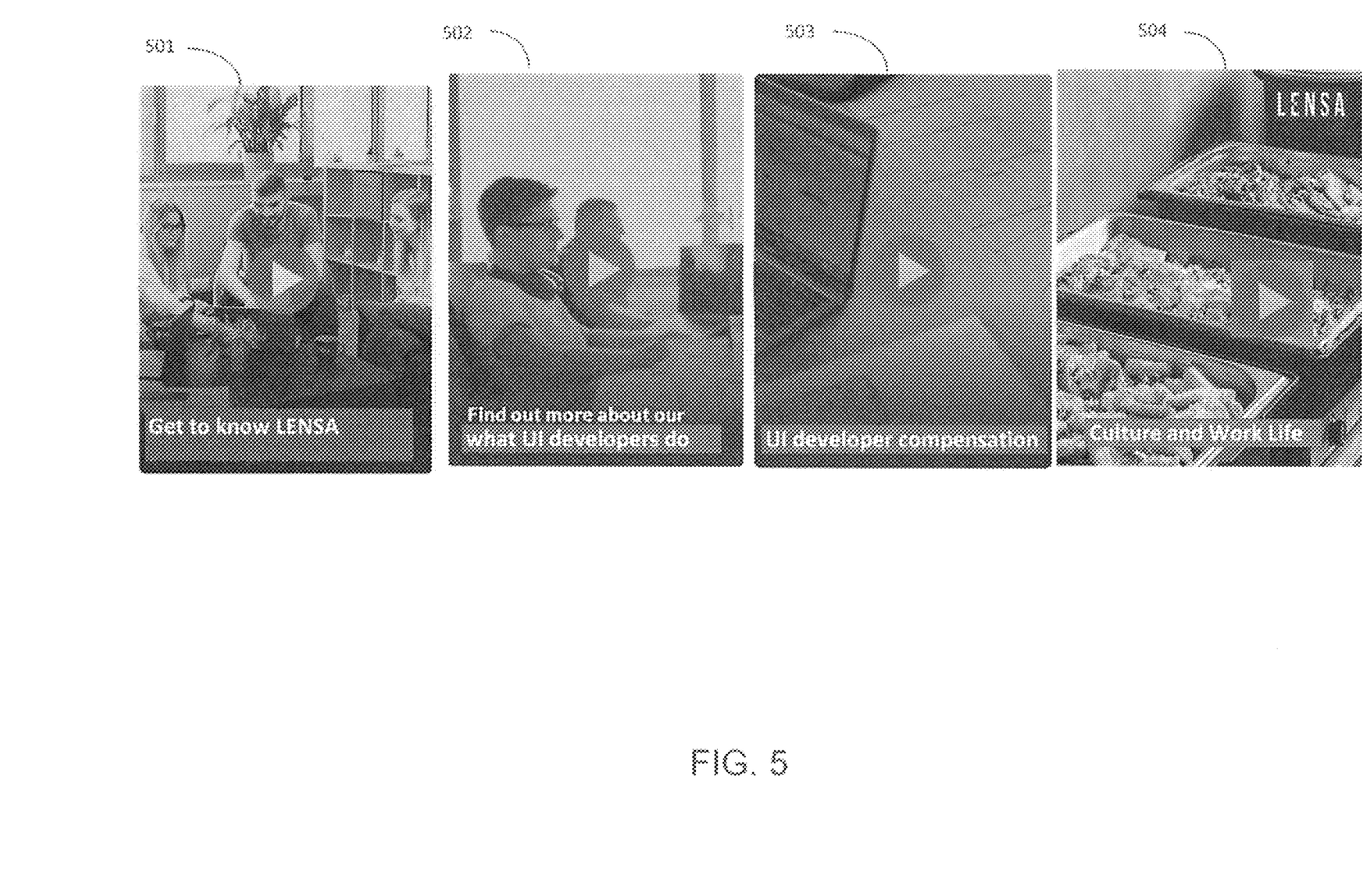
FIG. 5 illustrates an example sequence of video clips that together make up a job video.

This is illustrated by way of example in FIG. 5, in which the scenes of FIG. 3 are filled with a first video clip 501 that presents information about a particular employer, followed by a second video clip 502 that provides job description information, a third video clip 503 that provides compensation information, and a fourth video clip 504 that provides information about the culture and work life at the employer's location. Optionally, the system may generate all new clips before streaming any of the video clips to the user electronic device. Alternatively, the system may begin streaming the job video to the user device as soon as the first clip (or before a threshold number of clips) in the storyboard are retrieved and generated. In this way, the user does not have to wait for the process to complete, and the user can view the first scenes of the job video while the system concurrently retrieves or generates subsequent scenes of the job video. By serving the first scenes of the video to the user before the later scenes of the video are complete, the user experience can be improved because the user does not experience a delay after requesting more information.

In some situations, the system may complete the process described above for all extracted keywords, but it still may not have generated video clips for all scenes of the storyboard (208: NO). If this happens, at 231 the system may generate a prompt for the AI model (as in step 221), but it will use the job information category of the missing scene instead of a keyword to generate the prompt. The system will then create a video clip for the missing scene using the process of steps 222-227 as described above.

The methods described in this document may be implemented by a computing device, or by a computer program product comprising a memory device and computer programming instructions. Elements of an example computing device and/or system 600 are disclosed in FIG. 6. Computer system 600 can be any computer capable of performing the functions described in this document, such as the administrator processor 101, input computer 102, user electronic device 109, or any of elements 111-114 as shown in FIG. 1.

Figure 6:
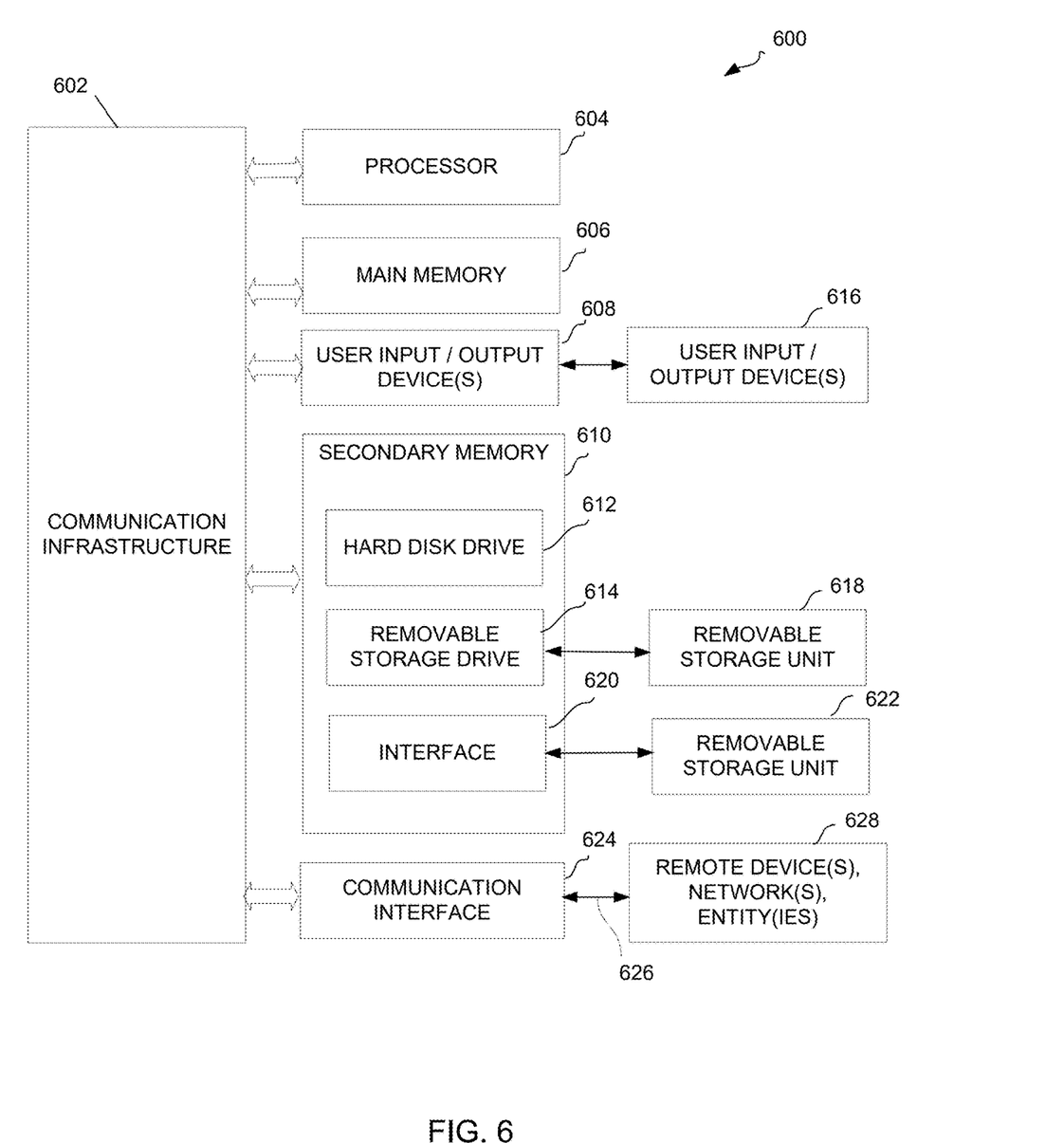
FIG. 6 illustrates example elements of a computing device that various computer processing components of the system may include.

Computer system 600 includes one or more processors (also called central processing units, or CPUs), such as a processor 604. Processor 604 is connected to a communication infrastructure or bus 602. Optionally, one or more of the processors 604 may each be a graphics processing unit (GPU). In various embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 616, such as monitors, keyboards, pointing devices, etc., that communicate with communication infrastructure 602 through user input/output interface(s) 608. In various embodiments, at least one of the input/output device(s) 616 is a display monitor or other display device with a display screen.

Computer system 600 also includes a main or primary memory 606, such as random access memory (RAM). Main memory 606 may include one or more levels of cache. Main memory 606 has stored therein control logic (i.e., computer software) and/or data.

Computer system 600 may also include one or more secondary memory devices 610. Secondary memory devices 610 may include, for example, a hard disk drive 612 and/or a removable storage device or drive 614. Removable storage drive 614 may be an external hard drive, a universal serial bus (USB) drive, a memory card such as a compact flash card or secure digital memory, a compact disc drive, an optical storage device, a tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be an external hard drive, a universal serial bus (USB) drive, a memory card such as a compact flash card or secure digital memory, a compact disc, an optical storage disk, and/any other computer data storage device. Removable storage drive 614 reads from and/or writes to removable storage unit 618 in a well-known manner.

According to an example embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In some embodiments, a tangible, non-transitory apparatus or article of manufacture comprising a tangible, non-transitory computer useable or readable medium having control logic (software) stored thereon may be referred to in this document as a "computer program product" or program storage device. This includes, but is not limited to, computer system 600, main memory 606, secondary memory 610, and removable storage units 618 and 622, as well as tangible articles of manufacture embodying any combination of the foregoing. Such control logic, when executed by one or more data processing devices (such as computer system 600), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described in this document.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include components of vehicles such as dashboard entertainment and navigation systems, as well as on-board vehicle diagnostic and operation systems. Additional elements that may be included in electronic devices are discussed above in the context of FIG. 6.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices and/or application programming interfaces (APIs). The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, a network may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

The terms "generative AI model", "AI model", and "large language model", which may sometimes be referred to simply as a "model", refer to system that can generate output in response to one or more input prompts, without being explicitly programmed or using a rules-based structure to generate its output. Instead, a model learns to generate output in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology. Examples of generative AI models include those known embodied in neural networks.

"Training" of a machine learning model may include building and/or updating a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified.

The features and functions described above, as well as alternatives, may be combined into many other different systems or applications. Various alternatives, modifications, variations, or improvements may be made by those skilled in the art, each of which is also intended to be encompassed by the disclosed embodiments.

As described above, this document discloses system, method, and computer program product. The system embodiments include a local computing device, which may have access to one or more remote computing devices. In some embodiments, one or more of the remote computing devices also may be part of the system. The computer program embodiments include programming instructions, stored in a memory device, that are configured to cause a processor to perform the methods described in this document.

The invention claimed is:

1. A method of generating a job listing video, the method comprising, by a processor:
   identifying a storyboard comprising a sequence of scenes, wherein each scene is associated with a unique job information category;
   in response to receiving a selection of a job listing from a user electronic device, processing text of the job listing to extract a plurality of keywords, each of which is associated with one of the job information categories;
   for each of the keywords, using the keyword to search a video clip library to retrieve any video clips having metadata that corresponds to the keyword;
   for any keyword for which a video clip is not found in the video clip library, generating a new video clip by:
      using the keyword to generate a prompt,
      inputting the prompt to a machine learning model,
      receiving narrative output by the machine learning model,
      using a text-to-speech processing module to process the narrative and convert the narrative to audio, and
      generating the new video clip to include the audio and visual content retrieved from a visual content library,
      in response to identifying that at least one of the scenes is a missing scene, where the missing scene is a scene from the storyboard that did not have a corresponding keyword in the text of the job listing:
         generating a second prompt that is based on the category of the missing scene,
         inputting the second prompt to the machine learning model,
         receiving second narrative generated by the machine learning model,
         using the text-to-speech processing module to process the second narrative and convert the second narrative to second audio, and
         generating a second new video clip that includes the second audio and second visual content, and
   streaming each new video clip and each retrieved video clip to the user electronic device in an order that corresponds to the sequence of scenes in the storyboard.

2. The method of claim 1, where the job information categories comprise:
   employer name;
   job description; and
   compensation.

3. The method of claim 1, wherein generating the new video clip further comprises:
   accessing the visual content library and retrieving the visual content as that which corresponds to one or more content elements of the narrative, to the keyword, or the job information category that corresponds to the keyword; and
   merging the visual content with the audio so that the audio will be presented with the visual content when the new video clip is displayed on the user electronic device.

4. The method of claim 1, further comprising saving the new video clip to the video clip library for use in response to future job listing selections.

5. The method of claim 1, wherein generating the second new video clip is done before streaming each new video clip and each retrieved video clip to the user electronic device begins.

6. The method of claim 1, wherein generating the second new video clip is done after streaming at least one of the new video clips or retrieved video clips to the user electronic device begins.

7. A computer program product comprising:
a non-transitory computer-readable medium containing programming instructions that, when executed by a processor, will cause the processor to:
identify a storyboard comprising a sequence of scenes, wherein each scene is associated with a unique job information category;
in response to receiving a selection of a job listing from a user electronic device, process text of the job listing to extract a plurality of keywords, each of which is associated with one of the job information categories;
for each of the keywords, use the keyword to search a video clip library to retrieve any video clips having metadata that corresponds to the keyword;
for any keyword for which a video clip is not found in the video clip library, generate a new video clip by:
using the keyword to generate a prompt,
inputting the prompt to a machine learning model,
receiving narrative output by the machine learning model,
using a text-to-speech processing module to process the narrative and convert the narrative to audio, and
generating the new video clip to include the audio and visual content retrieved from a visual content library;
in response to identifying that at least one of the scenes is a missing scene, where the missing scene is a scene from the storyboard that did not have a corresponding keyword in the text of the job listing:
generate a second prompt that is based on the category of the missing scene,
input the second prompt to the machine learning model,
in response to receiving second narrative generated by the machine learning model, use the text-to-speech processing module to process the second narrative and convert the second narrative to second audio, and
generate a second new video clip that includes the second audio and second visual content, and
stream each new video clip and each retrieved video clip to the user electronic device in an order that corresponds to the sequence of scenes in the storyboard.

8. The computer program product of claim 7, where the job information categories comprise:
employer name;
job description; and
compensation.

9. The computer program product of claim 7, wherein the instructions to generate the new video clip further comprise instructions to:
access the visual content library and retrieving the visual content as that which corresponds to one or more content elements of the narrative, to the keyword, or the job information category that corresponds to the keyword; and
merge the visual content with the audio so that the audio will be presented with the visual content when the new video clip is displayed on the user electronic device.

10. The computer program product of claim 7, further comprising instructions to save the new video clip to the video clip library for use in response to future job listing selections.

11. The computer program product of claim 7, wherein the instructions to generate the second new video clip comprise instructions to do so before streaming each new video clip and each retrieved video clip to the user electronic device begins.

12. The computer program product of claim 7, wherein the instructions to generate the second new video clip comprise instructions to do so after streaming at least one of the new video clips or retrieved video clips to the user electronic device begins.

13. A job information system comprising:
a data store containing a video clip library;
a text-to-speech processing module;
a processor; and
a non-transitory computer-readable medium containing programming instructions that, when executed by the processor, will cause the processor to:
identify a storyboard comprising a sequence of scenes, wherein each scene is associated with a unique job information category,
in response to receiving a selection of a job listing from a user electronic device, process text of the job listing to extract a plurality of keywords, each of which is associated with one of the job information categories,
for each of the keywords, use the keyword to search the video clip library to retrieve any video clips having metadata that corresponds to the keyword,
for any keyword for which a video clip is not found in the video clip library, generate a new video clip by:
using the keyword to generate a prompt;
inputting the prompt to a machine learning model;
receiving narrative output by the machine learning model;
using the text-to-speech processing module to process the narrative and convert the narrative to audio; and
generating the new video clip to include the audio and visual content retrieved from a visual content library;
in response to identifying that at least one of the scenes is a missing scene, where the missing scene is a scene from the storyboard that did not have a corresponding keyword in the text of the job listing:
generate a second prompt that is based on the category of the missing scene,
input the second prompt to the machine learning model,
receive second narrative generated by the machine learning model,
use the text-to-speech processing module to process the second narrative and convert the second narrative to second audio, and
generate a second new video clip that includes the second audio and second visual content, and
stream each new video clip and each retrieved video clip to the user electronic device in an order that corresponds to the sequence of scenes in the storyboard.

14. The system of claim 13, further comprising a data store that contains the visual content library, and wherein the instructions to generate the new video clip further comprise instructions to:
- access the visual content library and retrieve the visual content as that which corresponds to one or more content elements of the narrative, to the keyword, or the job information category that corresponds to the keyword; and
- merge the visual content with the audio so that the audio will be presented with the retrieved visual content when the new video clip is displayed on the user electronic device.

15. The system of claim 13, further comprising instructions to save the new video clip to the video clip library for use in response to future job listing selections.

16. The system of claim 13, wherein the instructions to generate the second new video clip comprise instructions to do so before streaming each new video clip and each retrieved video clip to the user electronic device begins.

17. The system of claim 13, wherein the instructions to generate the second new video clip comprise instructions to do so after streaming at least one of the new video clips or retrieved video clips to the user electronic device begins.

* * * * *